US005232598A

United States Patent [19]
Thomas et al.

[11] Patent Number: 5,232,598
[45] Date of Patent: Aug. 3, 1993

[54] POROUS INORGANIC MEMBRANES

[75] Inventors: Michael P. Thomas, Kingston, Canada; Andrew J. Sturgeon, Milton; Nigel I. Steward, Banbury, both of England

[73] Assignee: Ceramesh Limited, Banbury, United Kingdom

[21] Appl. No.: 847,076

[22] PCT Filed: Oct. 12, 1990

[86] PCT No.: PCT/GB90/01573
§ 371 Date: Jun. 10, 1992
§ 102(e) Date: Jun. 10, 1992

[87] PCT Pub. No.: WO91/05601
PCT Pub. Date: May 2, 1991

[30] Foreign Application Priority Data
Oct. 12, 1989 [GB] United Kingdom ................. 8923009

[51] Int. Cl.$^5$ ...................... E01D 71/02; E01D 71/04

[52] U.S. Cl. ......................... 210/500.25; 210/500.26; 210/509; 210/510.1

[58] Field of Search ........... 210/500.2, 500.23, 500.25, 210/500.26, 509, 506, 510.1; 428/566

[56] References Cited

FOREIGN PATENT DOCUMENTS 1509401 5/1978 United Kingdom .

Primary Examiner—Frank Sever
Attorney, Agent, or Firm—Richard T. Laughlin

[57] ABSTRACT

A composite membrane for microfiltration comprises a woven metal mesh support and films bridging the interstices comprising inorganic particles, e.g. zirconia, bonded together by 1–25% of an inorganic adhesive. Group IV metal e.g. Si or Zr phosphate adhesives are preferred. Low temperature film formation without sintering permits the use of non-refractory metal supports.

20 Claims, No Drawings

POROUS INORGANIC MEMBRANES

This invention concerns porous inorganic membranes. Such membranes are well known and widely used for filters, catalyst supports and other purposes. They have various advantages over organic membranes, including chemical inertness, thermal stability, high flux and uniform pore size.

EPA 348041 published Dec. 27, 1989 describes and claims a composite membrane comprising an inorganic support having interstices, and porous inorganic films of sintered non-metallic particles carried by the support and bridging the interstices. The support may be a mesh of fibres, particularly a woven metal mesh. Interstices are distinguished from pores and are defined as having diameters greater than 5 $\mu$m and lengths preferably less than 10 times their diameters. The interstices are bridged by porous films of inorganic material carried by the support, preferably substantially coplanar with the support, the minimum film thickness across the interstices being not more than about twice the thickness of the support. Preferably the films bridging the interstices have concave menisci.

These composite membranes have interesting properties. Because the supports are inherently flexible and because the films bridging the interstices are in longitudinal compression at ambient temperature, the composite membranes can be bent, often sharply without serious loss of filter performance. By virtue of their metal or other support, the membranes are also much easier to fix in position than prior membranes with ceramic supports.

These composite membranes may be prepared by dipping a woven metal mesh or other support in a slurry of the inorganic non-metallic particles, so as to create films bridging the interstices, and drying and heating the films to a temperature sufficient to partly sinter the particles. The temperature required for partial sintering must not be so high as to damage the support. This may place limitations, either on the material of the support, or on the nature and size of the inorganic particles used and hence on the pore size of the composite membrane. There is a need for porous membranes or films of inorganic particles that do not require excessively high temperatures in their preparation.

It is an object of this invention to provide porous inorganic membranes, based on particles of inorganic material, that do not require heating to the temperatures necessary to bond the particles by sintering alone. This object is achieved by the use of inorganic adhesives. A difference between the use of inorganic adhesives and sintering is that with inorganic adhesives there is essentially no long range transport of material of the particles.

The invention provides a composite membrane comprising a support having interstices of diameter greater than 5 $\mu$m and length less than ten times their diameters, and porous inorganic films carried by the support and bridging the interstices thereof, wherein the films comprise more than 50% by weight of particles of an inorganic material bonded together by means of less than 50% by weight of an inorganic adhesive. Preferably the films are substantially coplanar with the support. Preferably the films bridging the interstices have concave menisci. Preferably the support is inorganic, although organic polymers are possible. Preferably the support is a woven metal mesh, although glass and other refractory fibres can be used. Preferably the support is as described in the aforesaid EPA 348041.

The particulate inorganic material may be chosen to achieve desired properties, e.g. chemical and thermal resistance, in the membrane. Suitable materials include refractory materials such as alumina, magnesia, beryllia, zirconia, thoria, titania, chromium oxide, tin oxide, silica, silicon carbide, silicon nitride, boron nitride, boron carbide, titanium carbode, titanium nitride, chemical stoneware, chemical porcelain and zeolites; also carbon and silicon and metals such as aluminium.

The pore size of the porous films is related to the particle size. Large particles, above about 1 $\mu$m in diameter, tend to result in a pore size of approximately 10% of the particle diameter. Sub-micron particles may tend to give a pore size which is about 50% of the particle diameter. Particle size is not critical although the membranes of the invention are likely to be less useful if particles having average diameters below 0.1 $\mu$m or above about 50 $\mu$m are used. The particles may be of uniform size or alternatively graded. One preferred combination comprises 60 to 95% by weight of relatively larger particles of average size 0.5 to 50 $\mu$m, the balance being of much smaller particles having an average size in the range 4 nm up to 1 $\mu$m but not more than 0.1 times the size of the larger particles. This invention is partly concerned with membranes for microfiltration in which the average pore size is from 0.02–5 $\mu$m, particularly 0.05–1.0 $\mu$m.

The porosity of the porous films is due to the fact that the packing density of the particles is less than 100%. The inorganic adhesive need not itself be porous (although preferred adhesives are porous after heating, see below). The proportion of inorganic adhesive in the porous film is less than 50%. preferably 1 to 25% together with 75 to 99% of the particles, sufficient to bond the particles together without blocking the pores between them.

So far as inorganic adhesives are concerned, reference is directed to Adhesive Handbook 2nd Ed. Van Nostrand Reinhold 1977, pages 117–138, Chapter 6 by J. H. Wills entitled "Inorganic Adhesives and Cements". Preferred inorganic adhesives according to this invention set by a chemical reaction between two or more components thereof (other than water), e.g. by an acid-base reaction.

An acid-base cement develops via reactions between an acid and a base. The acid can be mineral (e.g. phosphoric acid), Lewis (e.g. magnesium chloride or sulphate) or even just an organic chelating agent (e.g. polyacrylic acid). The bases are generally metal oxides such as magnesium oxide, gel-forming silicate materials such as wollastonite, or an acid decomposable aluminiosilicate-type glass.

Commercial inorganic adhesives are based on silicates and phosphates, soluble silicates being the primary adhesives. Common ones are mainly the alkali metal (sodium, lithium, potassium) silicates which after heat treatment show good chemical resistance.

The phosphate materials are described in the following reference: Chapter 9 in "Concrete Science", published by Heydon 1981, ISBN-0 95501-703-1, Eds. V. S. Ramachandron, R. F. Feldman, J. J. Beaudoin. They are based mainly on the following types:
1. zinc-phosphate
2. silicate-phosphoric acid
3. oxide-phosphoric acid
4. acid phosphate 5. metaphosphate/poly(phosphate)

The bonding action in all cases is due to formation of acid phosphates. The adhesives may contain alumina to impart high temperature resistance.

Some inorganic adhesives are well known. A range based on alumina, zirconia and magnesia are sold by ECS. Co. Inc. and by Aremco Products Inc., both of New York. The use of phosphate-based inorganic adhesives is described in the following patent publications: DD 247128; DD 201044; JP 82057558; U.S. Pat. No. 3,999,995; U.S. Pat. No. 4,288,346.

According to the invention, the inorganic adhesive is preferably phosphate-based, since these show excellent temperature and chemical resistance. Particularly preferred are refractory adhesives based on a group IV phosphate. Silicon orthophosphate ($Si[HPO_4]_2$) is readily prepared by mixing a silica gel with phosphoric acid. The orthophosphate is not stable on heating and readily forms silicon pyro-phosphate ($SiP_2O_7$) on heating above 200° C. Silicon pyrophosphate is highly resistant to chemical attack. It is unaffected by strong acids including hot concentrated sulphuric acid and 40% aqueous hydrofluoric and is only slowly attacked by hot concentrated alkali (N. H. Ray "Inorganic Polymers", Academic Press, Chapter 6 pages 141 to 143). Other group IV metals which form refractory pyrophosphates with similar properties and also suitable for use as adhesives in the present invention, are Zr, Sn, Ge, Ti, Hf and Pb.

The membranes and films with which this invention is concerned are prepared from a fluid, generally aqueous, precursor. According to one preferred method a sol or colloidal dispersion of silica or other group IV metal oxide is mixed with orthophosphoric acid in equimolar proportions. Depending on concentrations, the resulting sol may set to a gel. The sol or gel is diluted and mixed in chosen proportions with the chosen particulate inorganic material. Other conventional additives may be included in conventional concentrations. In particular, an organic binder may be needed to provide film-forming properties prior to heating. Most or all volatile and organic components will be removed during the heating step, with the result that the final film consists essentially of the particles of inorganic material and the inorganic adhesive.

According to another preferred method, particles of a refractory material are mixed with a solution of a phosphoric acid or an acid solution of a phosphate salt, under conditions to cause the solution to partly dissolve the particles. The resulting slurry comprises the refractory particles (whose surfaces have been attacked) and a phosphate adhesive (formed in situ). The acid phosphate used preferably has a cation such as ammonia or an amine which volatilises off during the subsequent heating step. In the resulting membrane, the inorganic particles and the inorganic adhesive have a common cation.

The resulting fluid precursor may be formed into the desired film by standard techniques. With mesh supports, application is preferably effected by dipping, brush coating, roller coating or spraying. It is often preferable to perform the dipping procedure two or more times, a film being formed by ambient temperature drying or heat treating between each dip. By this means more reliably complete coverage of all interstices of the substrate may be achieved.

The resulting films or membranes are then heated to a temperature required to cure the adhesive and perhaps also to drive off any volatile or organic components. Curing temperatures may be as low as 80° C. for some commercially available inorganic adhesives. It should not generally be necessary to heat at temperatures above 800° C. Optimum temperatures depend on the nature of the support and of the adhesive and are likely to be in the range 200° to 600° C., particularly when the adhesive is based on a group IV phosphate. Sintering of the inorganic particles is not necessary, but may be advantageous to increase strength or adjust pore size.

The lower curing temperatures required as a result of the use of inorganic adhesives, give rise to several advantages. One is reduced energy and capital costs. Another is the ability to use supports, e.g. woven mesh supports, that are not themselves refractory. For example, if curing temperatures are kept below 500° C. preferably below 450° C., it becomes possible to use ordinary stainless steel or aluminium wire mesh. Still lower curing temperatures may permit the use of organic supports.

The membranes of this invention are useful substrates for permeable or microporous films. Microporous inorganic films may be formed by sol-gel techniques as described in EPA 242208. Permeable or microporous organic films may be formed by techniques described in EPA 242209. When such films are formed on one face of membranes supported on a wire or fibre mesh, that face may preferably be continuous. In other words, in order to achieve maximum porosity, it is preferred that the mesh support not "show through" the face of the porous membrane to which the permeable or microporous film is applied. In this case, the porous membrane need not be exactly coplanar with the support. These additional films may make the composite membranes suitable for ultrafiltration with average pore sizes in the range 0.001–0.5 $\mu$m.

The following examples illustrate the invention.

EXAMPLE 1

Colloidal silica sols were obtained commercially. Syton X30 sol was obtained from Morrisons Chemicals, Liverpool, U.K.

To 40 mls of a Syton X30 sol of concentration 342.6 gl$^{-1}$ were added 30.2 mls of concentrated (85%) orthophosphoric acid, until the mixture reached a composition equivalent to $SiP_2O_7$ ($SiO_2.P_2O_5$). Mixing resulted in an exothermic reaction and the mixture turned turbid. Within several minutes this cleared to result in a clear transparent sol, which set to a silicon phosphate gel in 0.5 to 2 hours.

14 ml of the mixture was added to 60 mls of deionised water. This was combined with 90 g of a zirconia powder of mean particle size less than two microns, and mixed to form a slurry. The slurry was ball milled for one hour in a polymeric container to break down agglomerates, and brush coated onto a sheet of acetone degreased woven 100 mesh Inconel 600 (nickel-chromium-iron alloy mesh supplied by G. Bopp and Co. Ltd.). Heat treatment was used to chemically bond the coating suspension, according to the following schedule:

a. heating at 60° C. per hour to 500° C.
b. holding at 500° C. for 1 hour
c. cooling at 60° C. per hour to room temperature.

Heat treatment resulted in the formation of microporous composite ceramic/metal structure comprising a non-powdery ceramic coating suspended within the metal mesh framework. The ceramic coating was porous to water and exhibited negligible weight loss upon immersion in deionised water for 10 days.

The pure water flux through the membrane was 1 ml $min^{-1} cm^{-2}$ at 70 kPa. It is envisaged that considerable control over the pore size, and hence flux, of the membranes described in this invention, can be effected by varying the concentration of the silicon phosphate mixture, and the particle size of the zirconia powder.

Samples of the silicon phosphate gel were calcined at various temperatures, 500° C., 600° C. and 700° C., and examined using x-ray diffraction to determine the phases present. In all cases a dry, hard, porous material was formed, in which crystalline silicon pyro-phosphate was detected.

Similar results were obtained when 100 mesh stainless steel was used in place of the Inconel 600.

EXAMPLE 2

Silicon Phosphate Bonded Zirconia Composite Membrane

To a commercially available silica sol, Syton X30, (obtained from Morrisons Chemicals, Liverpool, U.K.) having an equivalent silica concentration equal to 342.6 $gl^{-1}$, was added concentrated (85%) orthophosphoric acid. The amount added was sufficient to give a $SiO_2$:$P_2O_5$ ratio of 1:1. The exact quantities mixed were as follows:

| Syton X30 | 40 mls |
|---|---|
| Orthophosphoric Acid | 30.2 mls |

The resulting mixture underwent a mild exothermic reaction, to produce a turbid liquid. Within several minutes this cleared to give a transparent sol. This then set to a clear gel in 0.5 to 2 hours.

While the mixture was a liquid sol, 10 mls was transferred to 120 mls of demineralised water. After stirring, 90 g of Zirconia powder, mean particle size less than 5 μm, was added to form a slurry. The produced slurry had a composition equivalent to:

| $ZrO_2$ | 90.0 g |
|---|---|
| $SiO_2.P_2O_5$ | 6.4 g |
| $H_2O$ | 120 mls |

Using values of 5.89 $gcm^{-3}$ and 3.32 $gcm^{-3}$ for the densities of monoclinic $ZrO_2$ and silicon pyrophosphate $SiO_2$, $P_2O_5$, ($SiP_2O_7$) respectively, the slurry composition expressed in volume percent corresponds to:

| | Vol % | Vol % (excluding water) |
|---|---|---|
| $ZrO_2$ | 11.0 | 88.4 |
| $SiO_2$, $P_2O_5$ | 1.5 | 11.6 |
| $H_2O$ | 87.5 | |

The slurry was ball milled for 1 hour in a polymeric container to break down agglomerates, and brush coated onto a sheet of acetone degreased woven 100 mesh Inconel 600 (supplied by G. Bopp and Co. Ltd). After drying in air, a heat treatment was applied to chemically bond the coating suspension according to the following schedule:
  heating at 60° C. per hour to 500° C.
  holding at 500° C. for 1 hour
  cooling at 60° C. per hour to room temperature.

Heat-treatment resulted in the formation of a microporous composite ceramic/metal structure, comprising a non-powdery ceramic coating suspended within the metal framework. The suspended ceramic menisci consisted of angular zirconia particles bonded together with a silicon pyrophosphate Phase.

X-ray diffraction studies of the silicon phosphate gel calcined at temperature has shown silicon pyrophosphate ($SiP_2O_7$) is readily formed at or above 500° C.

The pure water flux through the prepared membrane was measured at 35, 70 and 140 kPa. Measured permeate fluxes were as follows:

| 35 kPa | 0.48 ml $min^{-1} cm^{-2}$ |
|---|---|
| 70 kPa | 0.97 ml $min^{-1} cm^{-2}$ |
| 140 kPa | 1.88 ml $min^{-1} cm^{-2}$ |

A gas burst for this membrane was found to be in excess of 500 kPa. Pore size distribution, determined using mercury porosimetry, gave a mean pore size of 0.352 μm.

The resistance to corrosion of the membrane was examined in 4 solutions; demineralised water, 0.1M HCl, concentrated $HNO_3$ (S.G 1.42), and $NH_4OH$ solution pH 10.00. Percentage weight loss of the membrane immersed in each solution for 7 days (168 hours) are given below. Figures are also included from a similar experiment in which the curing temperature was only 450° C.

| | % Weight Loss of Membrane | | |
|---|---|---|---|
| | Silicon Phosphate bonded Zirconia | | Sintered Zirconia |
| Solution | (500° C.) | (450° C.) | (950° C.) |
| Demineralised Water | 0.11 | 0.28 | 0 |
| 0.1M HCl | 0.30 | 2.90 | 2.32 |
| $HNO_3$ | 0.54 | 0.43 | 0.09 |
| $NH_4OH$ | 0.03 | 0.64 | 0.16 |

Curing at 500° C. gave excellent resistance to corrosion in these solutions, comparable to a sintered microporous zirconia membrane. Curing at 450° C. also gave acceptable results.

Similar results were obtained when 100 mesh stainless steel was used in place of the Inconel 600.

EXAMPLE 3

Zirconium Phosphate Bonded Zirconia Composite Membrane

Into 72 mls of demineralised water 12 g of ammonium dihydrogen phosphate ($NH_4H_2PO_4$) was dissolved. While stirring, 90 g of zirconia powder, having a mean particle size under 5 μm (obtained from Universal Abrasives), was added producing a slurry. The resulting slurry had a measured pH of 4.6 and a composition equivalent to:

| $ZrO_2$ | 90 g |
|---|---|
| $NH_4H_2PO_4$ | 12 g |
| $H_2O$ | 72 mls. |

The slurry was ball milled for 1 hour in a polymeric container and, as in Examples 1 and 2, brush coated onto a 100 mesh size Inconel 600. Due to the mild acidic nature of this slurry, compared to Examples 1 and 2, a woven aluminium mesh can be used.

After drying in air, the coated mesh was chemically bonded using a heat-treatment consisting of:
heating at 60° C. per hour to 600° C.
holding at 600° C. for 1 hour
cooling at 60° C. per hour to room temperature.

Heat-treatment results in the formation of a microporous composite membrane comprising a non-powder ceramic coating supported by a metal mesh framework. The slurry was applied in such a way as to preferentially deposit a thicker layer on one side of the meniscus, to allow the coating to extend beyond the mesh wire radius.

Examination of the ceramic membrane surface shows it to consist of angular particles chemically bonded, to give a highly porous structure. The pure water flux through the prepared membrane was measured at 35, 70 and 140 kPa.

| | |
|---|---|
| 35 kPa | 1.4 ml min$^{-1}$ cm$^{-2}$ |
| 70 kPa | 3.3 ml min$^{-1}$ cm$^{-2}$ |
| 140 kPa | 5.4 ml min$^{-1}$ cm$^{-2}$ |

Gas burst pressure for this membrane was found to be in excess of 500 kPa.

Pore size distribution was evaluated using mercury porosimetry, giving a mean pore size of 0.376 μm.

As for Example 2, resistance to corrosion of the membrane was examined in 4 solutions; demineralised water, 0.1M HCl, concentrated HNO$_3$ (S.G 1.42), and a NH$_4$OH solution of pH 10. Percentage weight loss observed for the membrane immersed in the solution for 7 days (168 hours) are given below:

| | Zirconium Phosphate bonded | Sintered Zirconia (950° C.) |
|---|---|---|
| Demineralised Water | 0.10 | 0 |
| 0.1M HCl | 2.11 | 2.32 |
| HNO$_3$ | 0.83 | 0.09 |
| NH$_4$OH | 0.16 | 0.16 |

Excellent corrosion resistance is observed for the zirconium phosphate bonded microporous membrane.

EXAMPLE 4

Ceramic Cement Bonded Zirconia Composite Membrane

A range of low temperature curing ceramic adhesives is available from Aremco Products Inc. Three cement types were used in preparing ceramic composite membranes: a phosphate composition with alumina, Aremco 503; a silicate composition with zirconia, Aremco 516; and a silicate composition with magnesium oxide, Aremco 571. Other ceramic cement types may be suitable.

10 g of adhesive was added to 60 ml of demineralised water. After stirring to thoroughly disperse the ceramic adhesive, 90 g of ZrO$_2$ was added to form a slurry. The zirconia powder had a mean particle size under 5 μm. The slurry was ball milled for 24 hours and brush coated onto a 100 mesh Inconel 600.

After drying in air, the coated mesh was subjected to a heat-treatment to cure the ceramic adhesive. A suitable heat-treatment is as follows:

93° C. for 2 hours
121° C. for 1 hour
250° C. for 1 hour
with a slow ramp rate between each temperature, typically 60° C. per hour. The composite membrane formed comprised microporous menisci of zirconia particles adhered together by the ceramic adhesive, suspended within the Inconel mesh interstices. The prepared membranes were observed to be porous to pure water.

Corrosion resistance of each membrane was evaluated in four solutions; demineralised water, 0.1M HCl, concentrated HNO$_3$ (S.G. 1.42), and a NH$_4$OH solution of pH 10. The percentage weight loss for each membrane, prepared using three of the ceramic adhesives, is given below for an immersion period of 7 days (168 hours).

| | Ceramic Adhesive | | |
|---|---|---|---|
| Solution | 503 | 516 | 571 |
| Demineralised Water | 0.14 | 0.48 | 0.54 |
| 0.1M HCl | 2.67 | 2.28 | 2.49 |
| Conc HNO$_3$ | 1.14 | 0.29 | 0.66 |
| NH$_4$OH | 0.67 | 0.95 | 0.25 |

EXAMPLE 5

Aluminium Phosphate Bonded Zirconia Composite Membrane

Commercially available aluminium dihydrogen phosphate Al(H$_2$PO$_4$)$_3$ from Albright and Wilson, having a specific gravity of 1.55 and 48 wt % phosphate was used. To 54.3 g of this phosphate solution was added 90 mls of demineralised water and 90 g of zirconia powder having a mean particle size of sub 2 μm. This amount being sufficient to give an Al:P ratio of 1:3, and an equivalent solid composition of:

| | |
|---|---|
| ZrO$_2$ | 90 g |
| Al(PO$_3$)$_3$ | 10 g |
| Water | 90 ml | i.e. 20 wt % of inorganic binder.

The slurry was ball milled for 1 hour in a plastic container to break down aggregates and homogenise the mixture, with a viscosity of ≈100 cp at 20° C. Woven 100 mesh Inconel 600 metal sheet was solvent degreased in a trichloroethane bath and followed by a thermal treatment at 450° C. for 10 minutes, to produce a clean surface onto which the slurry was brush coated.

After drying for 4 hours in air, a heat treatment was applied to chemically bond the coating suspension in the menisci of the woven metal mesh using the following firing schedule:

heating at 60° C./hr to 600° C., isothermal hold for 1 hour and cooling at 60° C./hr to room temperature. A second coat was applied and the firing schedule repeated to obtain a microporous composite ceramic/metal structure comprising a non-powdery ceramic coating suspended within the metal framework.

The pore size distribution was obtained by mercury porosimetry. The modal diameter was 0.2483 μm.

The resistance of the membrane under static conditions for 7 days to chemical attack was tested using 4 solutions namely demineralised water, concentrated nitric acid, 0.1M hydrochloric acid, and ammonium hydroxide solution in terms of percentage weight loss. It was then compared to that of a supported zirconia membrane sintered at 950° C.

| | Loss Wt % | |
|---|---|---|
| | Aluminum Phosphate | Sintered Zirconia |
| Demineralised Water | 0.11 | 0 |
| 0.1M HCl | 2.98 | 2.32 |
| Conc. HNO$_3$ | 0.87 | 0.09 |
| NH$_4$OH | 5.93 | 0.16 |

Aluminium phosphate bonded membrane is not as chemically resistant as sintered zirconia in extreme pH conditions. This is because the metaphosphate phase formed at the heat treatment of 600° C. is not as resistant as zirconia to alkali and acids. Chemical resistance could have been improved by heating to 900° C.

Pure water flowrates through the membrane were measured at 100 kPa and 385 kPa. The measured permeate fluxes were as follows:

| 100 kPa | 1.47 ml cm$^{-2}$ min$^{-1}$ |
|---|---|
| 385 kPa | 6.55 ml cm$^{-2}$ min$^{-1}$ |

The experiment was repeated with a different woven metal mesh support. There was used 100 mesh Hastealloy (a Ni, Cr, Fe, Si, Mn, Mo alloy mesh supplied by G. Bopp & Co., London N2). Similar results were obtained.

EXAMPLE 6

To 40 mls of a Syton X30 sol (obtained from Morrisons Chemicals, Liverpool) of concentration 342.6 gl$^{-1}$ were added 30.2 mls of concentrated (85%) orthophosphoric acid, this amount being sufficient to give an SiO$_2$:P$_2$O$_5$ ratio of 1:1. The resulting mixture underwent an exothermic reaction, to produce a turbid liquid. Within several minutes this cleared to give a transparent sol. This then set to a clear gel in 0.5 to 2 hours.

While the mixture was a liquid sol, 14 mls was transferred to 60 mls of demineralised water. After stirring, 90 g of zirconia powder having a mean particle size less than 2 μm was added to form a slurry. The slurry was ball-milled for 1 hour in a plastic container to break down agglomerates, and brush coated onto a sheet of acetone degreased woven 100 mesh stainless steel (supplied by Potter and Soar, Banbury). Heat treatment was used to chemically bond the coating on the stainless steel according to the following schedule:
a. Heating at 60° C. per hour to 500° C.
b. Isothermal hold at 500° C. for 1 hour.
c. Cooling at 60° C. per hour to room temperature.

Heat treatment resulted in the formation of microporous composite ceramic/metal structure comprising a non-powdery ceramic coating suspended within the stainless steel mesh framework. The ceramic coating was porous to water and exhibited negligible weight loss upon immersion in deionised water for 4 days.

The mean pore size as determined by Coulter Porometry was 0.14 μm, and the pure water flux through the membrane was 1 ml min$^{-1}$cm$^{-2}$ at 70 KPa.

EXAMPLE 7

Cement Membranes supported on Glass Fibre Filters

A silicon phosphate containing slurry of sub two micron zirconia particles was prepared as in Examples 1 and 2. An aluminum phosphate containing slurry of sub two micron zirconia particles was prepared as in Example 5.

Glass fibre filters were obtained from Whatman Paper Ltd., Kent, England (grade GF/D, nominal pore size range 4 to 12 micron), and from Poretics Corporation, Livermore, Calif., USA, type GC-50, nominal pore size 50 micron.

The silicon phosphate slurry was brush coated onto samples of both filters. The slurry was imbibed by capillary action into the filters, forming a fine filtration layer above and within the glass fibre substrate. After drying for four hours, the samples were heat treated according to the following schedule:
Ramp up 60° C. per hour to 500° C.
Hold one hour 500° C.
Ramp down 60° C. per hour to room temperature.

The resulting composites were rigid, porous filters. That the filters were porous was proved by observing water wicking through the composite membranes.

Similar results were obtained with the aluminium phosphate slurry.

We claim:

1. A composite membrane comprising a support having interstices of diameter greater than 5 μm and length less than ten times their diameters, and porous inorganic films carried by the support and bridging the interstices thereof, wherein the films comprise more than 50% by weight of particles of an inorganic material bonded together by means alternative to sintering, comprising less than 50% by weight of an inorganic adhesive.

2. The composite membrane as defined in claim 1, wherein the support is inorganic.

3. The composite membrane as defined in claim 2, wherein the films are of substantially coplanar with the support.

4. The composite membrane as defined in claim 2, wherein the films comprise from 75 to 99% of the particles bonded together by means of 1 to 25% of the adhesive.

5. The composite membrane as defined in claim 2, wherein the inorganic adhesive is phosphate based.

6. The composite membrane as defined in claim 2, wherein the inorganic adhesive is based on a group IV phosphate.

7. The composite membrane as defined in claim 2, wherein the particles and the adhesive have a common cation.

8. The composite membrane as defined in claim 2, wherein the inorganic adhesive is silicate based.

9. The composite membrane as defined in claim 1, wherein the films are of substantially coplanar with the support.

10. The composite membrane as defined in claim 9, wherein the inorganic adhesive is phosphate based.

11. The composite membrane as defined in claim 9, wherein the inorganic adhesive is based on a group IV phosphate.

12. The composite membrane as defined in claim 1, wherein the support is a woven metal.

13. The composite membrane as defined in claim 1, wherein the inorganic adhesive is phosphate based.

14. The composite membrane as defined in claim 1, wherein the films comprise from 75 to 99% of the particles bonded together by means of 1 to 25% of the adhesive.

15. The composite membrane as defined in claim 1, wherein the particles have an average diameter in the range of 0.1 to 50 μm.

16. The composite membrane as defined in claim 1, wherein the inorganic adhesive is phosphate based.

17. The composite membrane as defined in claim 1, wherein the inorganic adhesive is based on a group IV phosphate.

18. The composite membrane as defined in claim 1, wherein the particles and the adhesive have a common cation.

19. The composite membrane as defined in claim 1, wherein the inorganic adhesive is silicate based.

20. The composite membrane as defined in claim 1, wherein the inorganic adhesive is silicate based.

* * * * *